Figure 1:
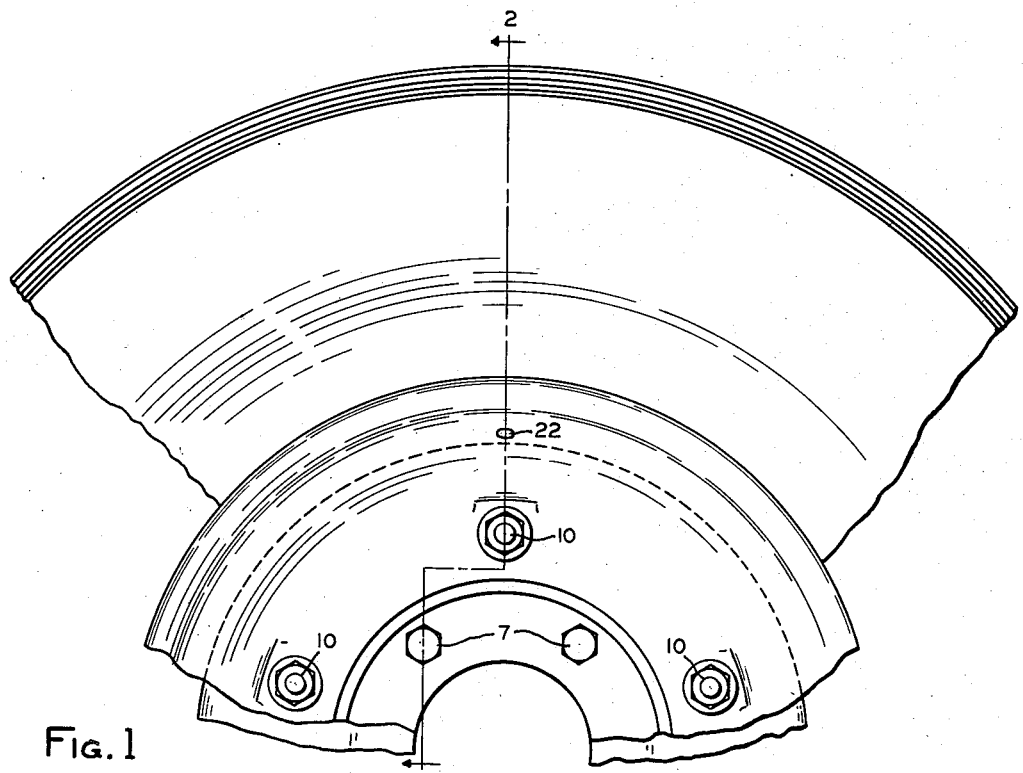

Jan. 8, 1952        J. W. WABER        2,581,736

RIM AND TIRE ASSEMBLY

Filed April 24, 1947

INVENTOR:
JAMES W. WABER

BY

ATTORNEY

Patented Jan. 8, 1952

2,581,736

UNITED STATES PATENT OFFICE 2,581,736

RIM AND TIRE ASSEMBLY

James W. Waber, Chicago, Ill.

Application April 24, 1947, Serial No. 743,638

3 Claims. (Cl. 152—396)

This invention relates to a new and useful improvement in a rim and tire assembly, and particularly to such an assembly adapted to be employed with wheels of motor vehicles.

An object of the invention is the provision of a wheel which will eliminate many of the shocks and jars occasioned by present-day wheel structures, yet will be stable and will tend to decrease lateral oscillations occasioned by the wheel and rim rolling laterally on the tire and tube.

Another object of the invention is the provision of a rim structure which is adapted to be applied to the wheels of many varieties of motor vehicles without any changes thereof, and to which the tube and tire may be expeditiously applied.

A feature of the invention resides in the structure which renders the tube practically pinch and puncture proof and provides greater strength and lateral stability, yet with decrease in weight.

The tire and tube of the present invention requires only about one-third of the air pressure generally employed at present. Due to the relatively low air pressure employed, tires having a less number of plies may be safely employed. The inner tire carcass generates less internal heat, and the large tire size provides greater surface for the radiation and dispersion of the heat generated.

As the present usual practice is to use a relatively small, high pressure tire, the result is a highly localized flexing in the road contact area of the tire with the result that a destructive heat is built up more rapidly than the small radiating tire surface can dissipate it.

Another feature resides in the provision of a tire which is loose fitting in relation to the rim, and as the valve stem for the tube is preferably omitted, this permits the tire to creep about the rim and thus distribute any localized wear occasioned by unbalance or other defect, over the whole circumference of the tire tread. The present common practice of maintaining the tire in fixed relation to the rim produces uneven tread wear with even slight mechanical imperfections in the running gear and steering apparatus which tends to impair the balance of the assembly resulting in "shimmy" and "tramp." Also, if in the assembly now commonly employed, the air pressure is permitted to fall below the optimum, the tube tends to creep about the rim, and the valve stem will be torn off the tube.

Another feature of the present invention resides in using a wheel and rim combination of two parts which are cast of a light metal, as aluminum or magnesium, and bolted together. This two-part construction of the rim produces a deep and relatively broad drop-center.

A still further feature resides in providing a rim with a space between its lateral edges approximately equal to, or greater than the lateral diameter of the tire, thus protecting the tire from curb injuries and the like, while the wide rim and tire add greatly to the stability of the car.

Another feature of the invention resides in forming the face of each of the rim parts, between the bead at its outer edge and the inner meeting edge thereof, outwardly curved or arched, thus securing ample strength of the rim flanges while employing less weight of metal.

Figure 2:
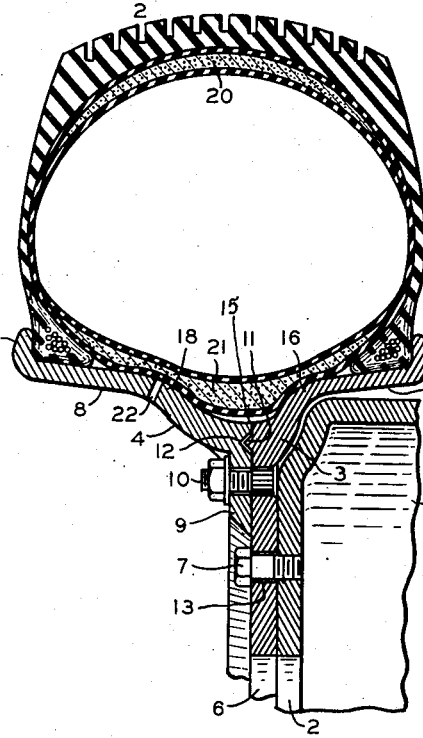

It is believed that the further disclosure of this invention will be most readily understood from a detailed description thereof in connection with the accompanying drawings, wherein Fig. 1 is a side view of a portion of the wheel hub with parts of the rim sections and tire secured thereto and Fig. 2 is a section along the line 2—2 of Fig. 1.

Referring now to the drawings in which like reference characters indicate the same parts in the different views, I schematically indicates the brake drum of a wheel having the inwardly extending annular flange 2 fixed thereto.

The wheel rim consists of two distinct parts generally indicated by the reference characters 3 and 4. The rim part 3 consists of the generally horizontally extending tire and tube supporting member 5 integral with which is the inwardly extending annular flange 6 which is secured to the part 2 by cap screws or bolts 7. The rim part 4 consists of the generally horizontally extending tire and tube supporting member 8, integral with which is the inwardly extending annular flange 9 which is secured to the part 6 by bolts or cap screws 10. Part 3 may be provided with the positioning rib 11 which will be received by a cooperating positioning groove 12 in the engaging surface of part 4, thus assuring that when the parts 3 and 4 are bolted together, they will assume the correct relative positions.

As the rim assembly has the annular flange 6, it may be secured to most motor vehicle wheels merely by the expedient of properly positioning the holes 13 in flange 6 which receive the cap screws 7.

The rim parts 3 and 4 will preferably be cast of some light metal as an aluminum alloy or magnesium, for if made of iron or steel, the weight would be excessive. In order that the necessary strength may be provided without the use of an undue amount of material, the laterally extending portion 5 of the part 3 is upwardly curved or arched between the lateral bead 14 of the rim and the point 15 where the two sections meet, as indicated at 16. In like manner, the part 8 of the rim part 4 is arched between lateral bead 17 and point 15, as shown at 18. This construction provides great strength to the supporting flanges 5 and 8 as is necessary on account of the tire bead seat being so far from the center line of the wheel. This design of the rim increases the angle of support, for instance, on the outboard side it is increased from the usual approximate 90 degrees between the generally horizontal supporting flange of the rim and the vertical plane of the wheel to an angle of approximately 120 degrees. The arrangement just described permits the elimination of much weight so that the present structure weighs less than the commonly employed pressed steel wheel and rim and is stronger and less liable to be bent or damaged.

As shown in Fig. 2 of the drawings, the tire employed with the present invention is of a lateral diameter not greater than the space protected by the rim. Having the whole tire within or between the lateral limits of the rim, not only tends to protect the tire from injury, but also produces a more stable support in which the tendency of the wheels and the vehicle supported thereby to roll laterally on the tires and tubes is greatly reduced.

The tube herein disclosed and employed with the present invention is such as is disclosed in applicant's application Serial No. 532,333, filed April 22, 1944, now abandoned, and has the protective inserts 20 and 21 of mastic at the tread and rim areas to greatly reduce the danger of the tube becoming pinched or punctured in either area.

In mounting the tire and the tube on the rim, the tube will be positioned within the tire. The tire with the tube therein will then be positioned on one of the rim sections and then the other rim section will be brought into a position so that it may be bolted or secured to the first rim section. This operation is facilitated by the drop-center structure of the rim where the two sections meet and also by the fact that the tire will be so formed that the beads thereof will not tightly engage the rim sections. After being mounted on the rim, inflation of the tube will be effected by the injection method—that is, by inserting a hollow needle through the protected portion of the tube through which air may be forced into the tube. If desired, the rim may be provided with a hole 22 to receive the needle. When such an opening is provided, the needle may be inserted through the tube without perforating any part of the tire, although inflation may be accomplished by inserting the needle through the tire and part of the tube protected by the mastic insert 21 or 20. When mounted in this manner, the danger of the tube becoming rim pinched is reduced to a minimum. The protective crescent of mastic 21 tends to further protect the tube from rim pinch.

When the tire is retained in fixed relation to the rim, any slight mechanical imperfections or unbalance in the wheel structure produces uneven and destructive tread wear, causing synchronizing moments which result in "shimmy" and "tramp." By employing a tire which fits the rim relatively loosely and a tube which has no valve stem, the tire is permitted to creep about the rim and so, by constantly offering new surfaces to the recurring localized distortions, any localized wear is uniformly distributed over the whole circumference of the tread of the tire.

Applicant's wheel is adapted to sustain loads of from 600 pounds to 2000 pounds or more per wheel merely by varying the air pressure. The conventional small, high pressure tire is at maximum efficiency only under a substantially definite pressure and its life and efficiency are greatly reduced by slight variation of only a pound or two from the optimum. With the present assembly air pressure varying from a low of 10 pounds per square inch with loads of 600 pounds to 800 pounds per wheel to a high of 30 pounds per square inch with loads of 2000 pounds to 2500 pounds per wheel may safely be employed without injurious results. It greatly increases tire life, permits easier steering, provides protection to the vehicle and load, as well as greater comfort and safety to the passengers.

Having thus described my invention, what I desire to secure by Letters Patent of the United States is:

1. In a wheel, a brake drum, a drop center tire rim comprising two sections, each section including a tire supporting flange extending laterally from the plane of the wheel, beads in which the outer edges of said tire supporting flanges respectively terminate, means for securing said rim sections to said brake drum, a tire mounted on the sections of said rim between said beads, the lateral diameter of said tire being substantially equal to the distance between the beads at the remote lateral edges of said rim sections, and a tube on said rim within said tire, the inner circumference of said tube being provided with a generally crescent-shaped insert of mastic material, said mastic insert being positioned between the beads of said tire to hold said beads in spaced relation.

2. In a wheel for a motor vehicle, a hub, a drop center rim, means for securing said rim to said hub, a tire mounted on said rim, the lateral surfaces of said tire extending radially from the outer edges of said rim and substantially parallel to the plane of the wheel, a tube on said rim within said tire, said tube being provided with a generally crescent-shaped insert of mastic material at its inner periphery, the said mastic insert being positioned between the beads of said tire to maintain said beads in spaced relation remote from said drop center.

3. In a wheel for a motor vehicle, a hub, a two-section drop center rim, means for securing one of said sections to said hub independently of the other rim section, means for securing the other rim section to said one of said rim sections, a tire mounted on said rim sections, the lateral surfaces of said tire extending radially from the outer edges of said rim and substantially parallel to the plane of the said wheel, a tube on said rim within said tire, said tube being provided with a generally crescent-shaped insert of mastic material at its inner periphery, the said mastic insert being positioned between the beads of said tire to maintain said beads in spaced relation remote from said drop center.

JAMES W. WABER.

REFERENCES CITED

The following references are of record in the file of this patent:

UNITED STATES PATENTS

| Number | Name | Date |
| --- | --- | --- |
| 1,285,719 | Jeffries | Nov. 26, 1918 |
| 1,885,901 | Ennis | Nov. 1, 1932 |
| 1,969,088 | Maranville | Aug. 7, 1934 |
| 2,187,557 | Gillespie | Jan. 16, 1940 |
| 2,209,803 | Webb | July 30, 1940 |
| 2,367,825 | Shaw | Jan. 23, 1945 |